US009000109B2

(12) United States Patent
Hamann et al.

(10) Patent No.: US 9,000,109 B2
(45) Date of Patent: Apr. 7, 2015

(54) HIGH STYRENE HIGH VINYL STYRENE-BUTADIENE RUBBER AND METHODS FOR PREPARATION THEREOF

(75) Inventors: Evemarie Hamann, Halle (DE); Silvia Valenti, Halle (DE); Karin Schmiedel, Halle (DE)

(73) Assignee: Styron Europe GmbH, Horgen (CH)

( * ) Notice: Subject to any disclaimer, the term of this patent is extended or adjusted under 35 U.S.C. 154(b) by 0 days.

(21) Appl. No.: 14/001,612

(22) PCT Filed: Mar. 1, 2012

(86) PCT No.: PCT/EP2012/053523
§ 371 (c)(1),
(2), (4) Date: Aug. 26, 2013

(87) PCT Pub. No.: WO2012/119917
PCT Pub. Date: Sep. 13, 2012

(65) Prior Publication Data
US 2013/0345379 A1 Dec. 26, 2013

(30) Foreign Application Priority Data
Mar. 4, 2011 (EP) .................................. 11156988

(51) Int. Cl.
C08F 4/48 (2006.01)
C08F 2/06 (2006.01)
C08F 236/10 (2006.01)
C08F 212/08 (2006.01)
C08L 9/06 (2006.01)

(52) U.S. Cl.
CPC ............. *C08F 236/10* (2013.01); *C08F 212/08* (2013.01); *C08L 9/06* (2013.01)

(58) Field of Classification Search
USPC .................. 524/572; 526/180, 181, 204, 340
See application file for complete search history.

(56) References Cited

U.S. PATENT DOCUMENTS

| 5,432,232 | A | * | 7/1995 | Hattori et al. ................... 525/99 |
| 5,532,327 | A | | 7/1996 | Bayley et al. |
| 5,698,646 | A | | 12/1997 | Kitamura et al. |
| 5,916,962 | A | | 6/1999 | Shibata et al. |
| 6,472,464 | B1 | | 10/2002 | Morita et al. |
| 2005/0020757 | A1 | | 1/2005 | Ozawa et al. |
| 2008/0015309 | A1 | | 1/2008 | Ozawa et al. |
| 2011/0178256 | A1 | | 7/2011 | Hamann et al. |

FOREIGN PATENT DOCUMENTS

| EP | 0798339 | 10/1997 |
| EP | 1462459 | 9/2004 |
| WO | WO2009/134665 | 11/2009 |

OTHER PUBLICATIONS

PCT/EP2012/053523 International Search Report dated May 21, 2012 (3 pages).
PCT/EP2012/053524 International Search Report dated May 21, 2012 (2 pages).

* cited by examiner

*Primary Examiner* — Fred M Teskin
(74) *Attorney, Agent, or Firm* — Brinks Gilson & Lione (57) ABSTRACT

A process for polymerization of a polymer containing monomeric units derived from a styrene monomer and a 1,3-butadiene monomer includes polymerizing the monomeric units in the presence of an initiator, a first polar agent, and a second polar agent. The first polar agent includes a structure (I): $R^{1'}R^{2'}N-Q-NR^{3'}R^{4'}$; and the second polar agent comprises a structure (II): $R^{1'}$, $R^{2'}$, $R^{3'}$, and $R^{4'}$ are each independently selected from the group consisting of an alkyl group and hydrogen; Q contains an alkylene group; $R^1$ and $R^2$ are each independently an alkyl group; and $R^3$, $R^4$, $R^5$, $R^6$, $R^7$ and $R^8$ are each independently selected from the group consisting of an alkyl group and hydrogen. Polymers prepared by the above process are described, as are compositions containing such a polymer, and articles containing at least one component formed from such a composition.

18 Claims, 3 Drawing Sheets

HIGH STYRENE HIGH VINYL STYRENE-BUTADIENE RUBBER AND METHODS FOR PREPARATION THEREOF

This application claims priority to International Application No. PCT/EP2012/053523 filed Mar. 1, 2012; and European Application No. 11156988.5 filed Mar. 4, 2011 the entire contents of each are incorporated herein by reference.

TECHNICAL FIELD

The present teachings relate generally to high styrene and high vinyl solution-based styrene-butadiene rubber (SSBR), and to methods for the preparation thereof.

BACKGROUND

High styrene and high vinyl SSBR is difficult to produce due to the kinetics of copolymerization. Typically, polar agents known as randomizers are added to the polymerization system in order to achieve high vinyl content and random styrene incorporation.

Tetramethylethylenediamine (TMEDA) is one such randomizer. However, as demonstrated by Comparative Examples 1 and 2 described below, TMEDA results in a significantly broader molecular weight distribution than is typically observed for anionic polymerization reactions when utilized for the polymerization of high styrene (styrene ratio >40%) SSBR—especially in the polymerization of rubber with high molecular weights.

Broad molecular weight distributions in anionic batch polymerization can result from chain transfer, metallation, and/or slow initiation reactions. These reactions reduce the amount of polymer chains that are still living at the conclusion of the polymerization reaction. Nowadays, high-performance SSBR is typically chain-end modified. Although such chain-end modification can significantly improve overall performance of a compound, it requires that the amount of living chain ends be as high as possible at the conclusion of the polymerization reaction. Furthermore, the reaction rate is low and more than 5 or 6 hours of polymerization are often required to end up with commercially relevant monomer conversions.

In short, a method for synthesizing high styrene and high vinyl SSBR with a narrow molecular weight distribution, a monomer conversion higher than 99%, a short polymerization time, and a high amount of living chain ends at the conclusion of the polymerization is highly desirable.

SUMMARY

The scope of the present invention is defined solely by the appended claims, and is not affected to any degree by the statements within this summary.

By way of introduction, a process for polymerization of a polymer containing monomeric units derived from a styrene monomer and a 1,3-butadiene monomer that embodies features of the present teachings includes polymerizing the monomeric units in the presence of an initiator, a first polar agent, and a second polar agent. The first polar agent includes a structure (I):

$$R^{1'}R^{2'}N-Q-NR^{3'}R^{4'} \quad (I);$$

and the second polar agent comprises a structure (II):

(II)

wherein $R^{1'}$, $R^{2'}$, $R^{3'}$, and $R^{4'}$ are each independently selected from the group consisting of an alkyl group and hydrogen; Q contains an alkylene group; $R^1$ and $R^2$ are each independently an alkyl group; and $R^3$, $R^4$, $R^5$, $R^6$, $R^7$ and $R^8$ are each independently selected from the group consisting of an alkyl group and hydrogen.

A polymer embodying features of the present teachings has at least the following characteristics: (a) a styrene content from about 40 to about 70 weight percent based on total polymer weight; (b) a vinyl content from about 30 to about 80 weight percent, preferably from about 40 to about 70 weight percent, based on total amount of polymerized 1,3-butadiene; and (c) a molecular weight distribution from about 1.05 to about 1.8.

DETAILED DESCRIPTION

The present inventors have discovered—surprisingly and unexpectedly—a polymerization process for preparing a high styrene and high vinyl SSBR with a significantly narrowed molecular weight distribution, high conversion (in some embodiments, higher than 99%), and short reaction time (in some embodiments, less than 3 hours). As further described below, the inventive process uses a combination of first and second polar agents. In some embodiments, the first and second polar agents correspond to TMEDA and DOP, respectively.

Figure 1A:
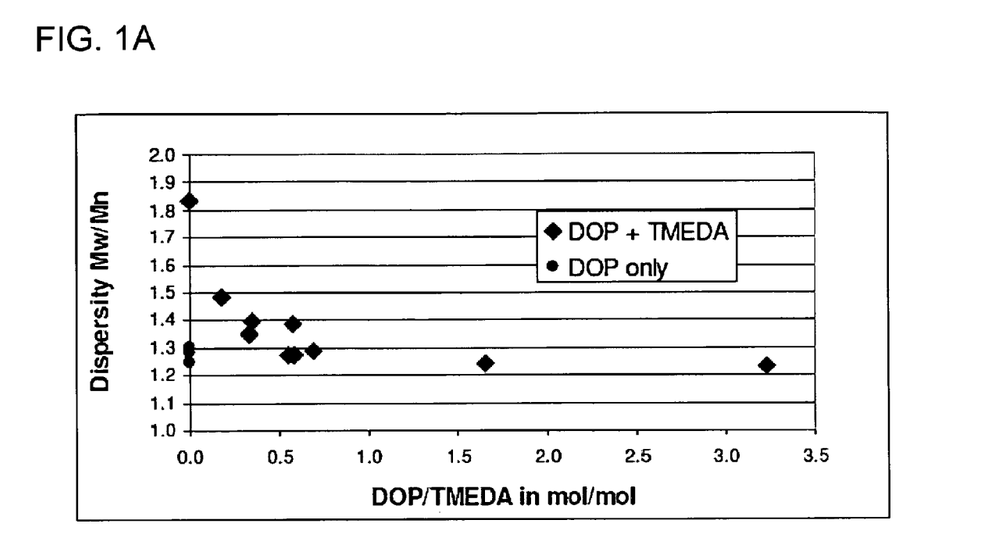
FIG. 1A illustrates the effect of adding ditetrahydrofurylpropane (DOP) to tetramethylethylenediamine (TMEDA) as a polar agent on the dispersity (Mw/Mn) of molecular weight distribution.
Figure 1B:
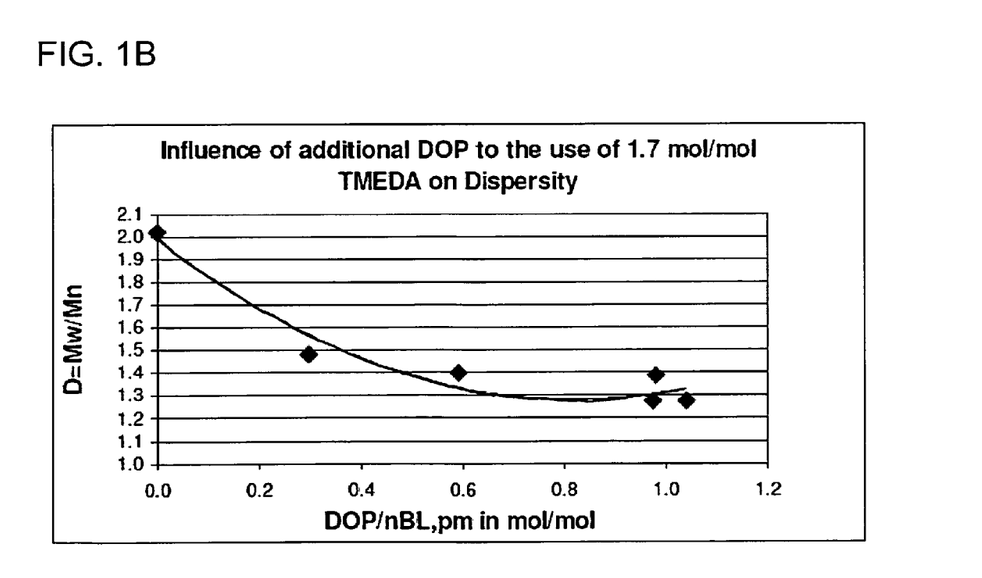
FIG. 1B illustrates the effect of adding DOP to TMEDA (1.7 mol/mol) as a polar agent on the dispersity (Mw/Mn) of molecular weight distribution.
Figure 1C:
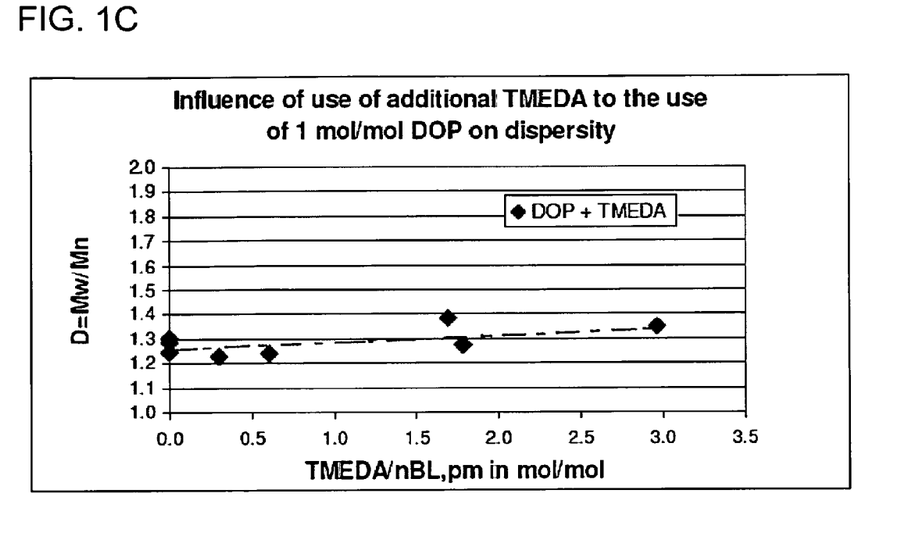
FIG. 1C illustrates the effect of adding TMEDA to DOP (1 mol/mol) as a polar agent on the dispersity (Mw/Mn) of molecular weight distribution.
Figure 2:
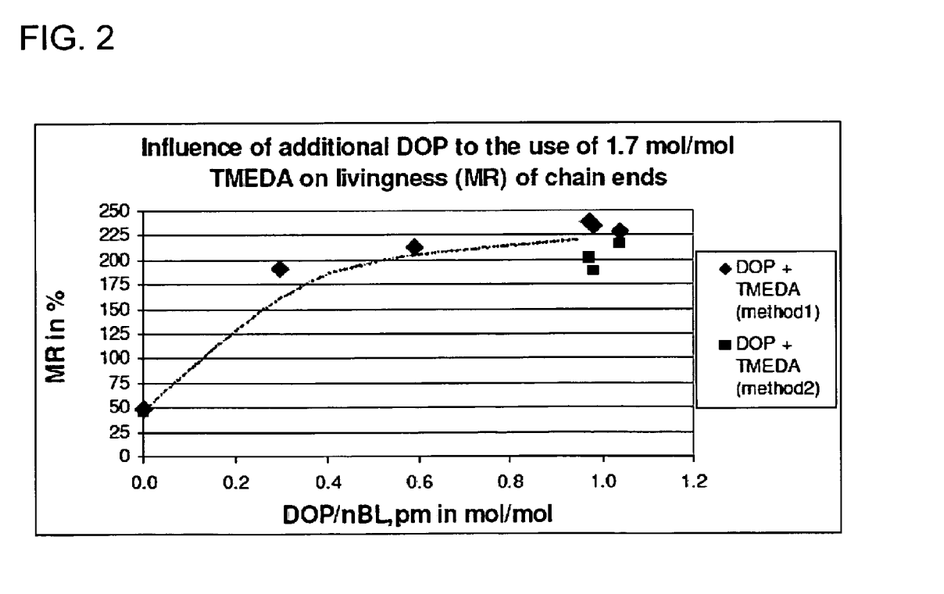
FIG. 2 illustrates the effect of adding DOP to TMEDA as a polar agent on the livingness of chain ends.
Figure 3:
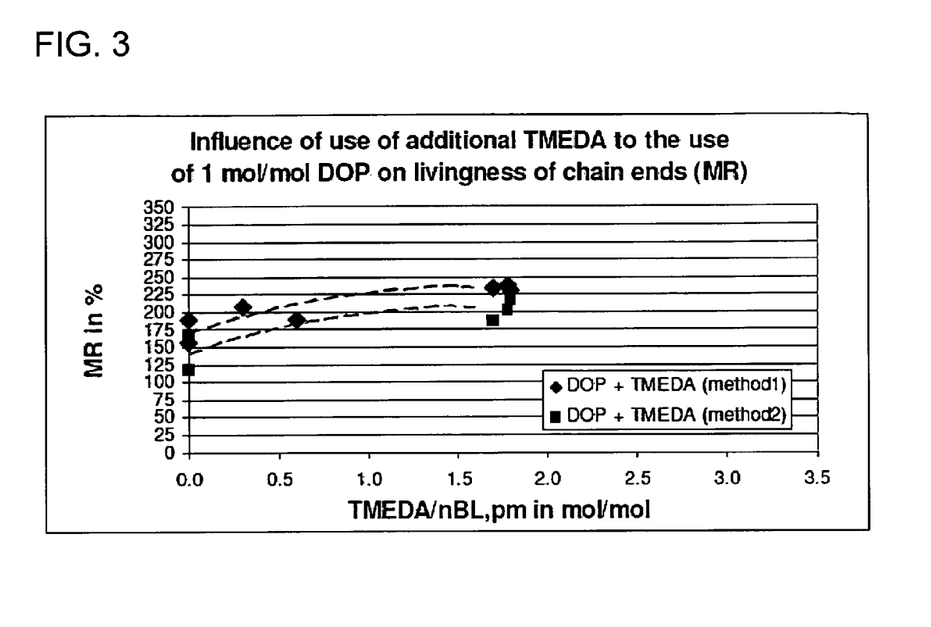
FIG. 3 illustrates the effect of adding TMEDA to DOP as a polar agent on the livingness of chain ends.
Figure 4:
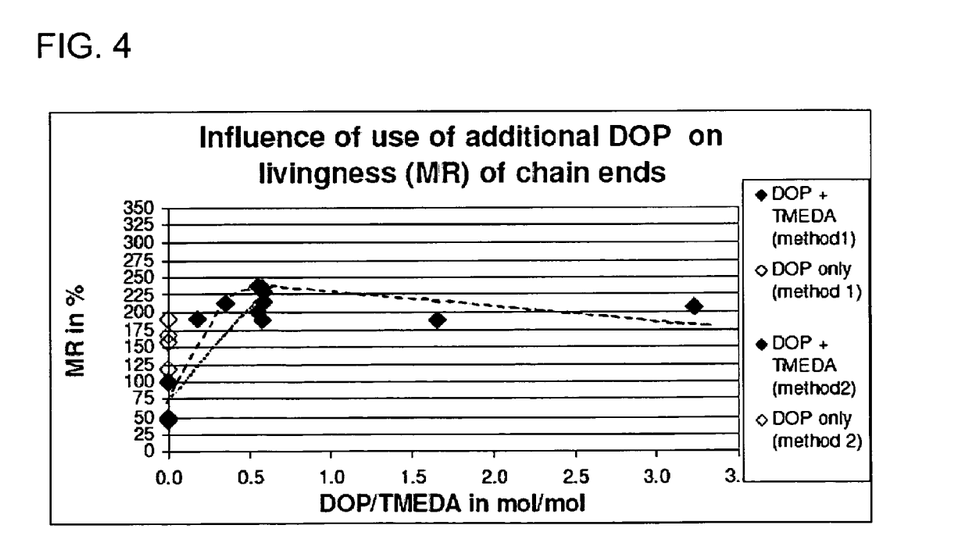
FIG. 4 illustrates the effect of the molar ratio of DOP/TMEDA on the livingness of chain ends.

Moreover, the present inventors have further discovered—surprisingly and unexpectedly—that the use of certain combinations of first and second polar agents (e.g., DOP and TMEDA) results not only in a narrower molecular weight distribution of polymer at the end of polymerization, as shown in FIG. 1A, but also in a significant increase in the livingness of the polymer chains at the end of polymerization relative to the use of TMEDA alone, as shown in FIG. 2, or the use of DOP alone, as shown in FIG. 3. The present inventors have further discovered that particularly good results were achieved at a ratio of DOP/TMEDA between about 0.5 and about 1 mol/mol, as shown in FIG. 4. In short, as further described hereinbelow, the present inventors have achieved—surprisingly and unexpectedly—an improvement in molecular weight distribution by using a combination of polar agents as compared to the use of TMEDA alone, and an improvement in the livingness of chain ends as compared to the use of DOP alone.

Throughout this description and in the appended claims, the following definitions are to be understood:

The term "polymer" refers broadly to a material prepared via the polymerization of monomeric units. As used herein, the term "polymer" subsumes the terms "homopolymer" (polymeric material prepared from a single type of monomer), "copolymer" (polymeric material prepared from two different types of monomers), and "interpolymer" (polymeric material prepared from more than two different types of monomers).

The phrase "alkyl group" refers to a substituted or unsubstituted, straight, branched or cyclic hydrocarbon chain containing, preferably, from 1 to 20 carbon atoms. Representative examples of unsubstituted alkyl groups for use in accordance with the present teachings include but are not limited to methyl, ethyl, propyl, iso-propyl, cyclopropyl, butyl, iso-butyl, tert-butyl, sec-butyl, cyclobutyl, and the like.

The term "process" used in reference to polymerization reactions includes batch, semi-batch, and/or continuous processes.

The term "vinyl content" refers to a mass (or weight) percentage of butadiene incorporated in the 1,2 position in the polymer chain, and is based on the butadiene portion (total amount of polymerized butadiene) in the polymer.

The term "styrene content" refers to a mass (or weight) percentage of styrene in the polymer, and is based on the total weight of the polymer.

The term "composition" refers to a mixture of materials including a polymer material and, optionally, reaction products and/or decomposition products formed from the polymer material.

The term "active initiator" (nBL,pm) refers to the amount of initiator (e.g., an organlithium) that takes part in a polymerization reaction and that is not deactivated by impurities contained in the reaction medium.

By way of general introduction, a process for polymerization of a polymer comprising monomeric units derived from a styrene monomer and a 1,3-butadiene monomer in accordance with the present teachings includes polymerizing the monomeric units in the presence of an initiator, a first polar agent, and a second polar agent. In some embodiments, the first polar agent comprises a structure (I):

In some embodiments, the second polar agent comprises a structure (II):

In some embodiments, $R^{1'}$, $R^{2'}$, $R^{3'}$, and $R^{4'}$ are each independently selected from the group consisting of an alkyl group and hydrogen. In some embodiments, $R^{1'}$, $R^{2'}$, $R^{3'}$, and $R^{4'}$ are each independently selected from the group consisting of hydrogen and a $C_1$-$C_4$ alkyl group. In some embodiments, $R^{1'}$, $R^{2'}$, $R^{3'}$, and $R^{4'}$ are each independently selected from the group consisting of hydrogen and methyl. In some embodiments, $R^{1'}$, $R^{2'}$, $R^{3'}$, and $R^{4'}$ are each hydrogen.

In some embodiments, Q comprises an alkylene group. In some embodiments, the alkylene group comprises a structure —$(CH_2)_n$—, wherein n is an integer equal to or greater than 2. In some embodiments, n is 2 (e.g., Q is ethylene). In some embodiments, n is 3 (e.g., Q is propylene).

In some embodiments, $R^1$ and $R^2$ are each independently an alkyl group. In some embodiments, $R^1$ and $R^2$ are each independently a $C^1$-$C^4$ alkyl group. In some embodiments, $R^1$ and $R^2$ are each methyl.

In some embodiments, $R^3$, $R^4$, $R^5$, $R^6$, $R^7$ and $R^8$ are each independently selected from the group consisting of an alkyl group and hydrogen. In some embodiments, $R^3$, $R^4$, $R^5$, $R^6$, $R^7$ and $R^8$ are each independently selected from the group consisting of hydrogen and a $C^1$-$C^4$ alkyl group. In some embodiments, $R^3$, $R^4$, $R^5$, $R^6$, $R^7$ and $R^8$ are each independently selected from the group consisting of hydrogen and methyl. In some embodiments, $R^3$, $R^4$, $R^5$, $R^6$, $R^7$ and $R^8$ are each hydrogen.

In some embodiments, a first polar agent in accordance with the present teachings is tetramethylethylenediamine (TMEDA). In some embodiments, TMEDA is used in an amount higher than 0.3 mol/mol. In some embodiments, TMEDA is used in an amount higher than 0.4 mol/mol. In some embodiments, TMEDA is used in an amount higher than 0.5 mol/mol.

In some embodiments, a second polar agent in accordance with the present teachings is ditetrahydrofurylpropane (also known as 2,2-di(2-oxolanyl)propane or DOP). In some embodiments, DOP is used in an amount higher than 0.2 mol/mol. In some embodiments, DOP is used in an amount higher than 0.3 mol/mol. In some embodiments, DOP is used in an amount higher than higher than 0.5 mol/mol.

In some embodiments, a molar ratio of the second polar agent to the first polar agent (e.g., DOP/TMEDA) is between about 0.01 and about 10. In some embodiments, the molar ratio is between about 0.1 and about 3. In some embodiments, the molar ratio is between about 0.3 and about 1.

In some embodiments, the styrene content of a polymer in accordance with the present teachings is from about 20 to about 80 weight percent based on total weight of the polymer. In some embodiments, the styrene content is from about 40 to about 70 weight percent based on total weight of the polymer.

In some embodiments, the vinyl content of a polymer in accordance with the present teachings is from about 30 to about 80 weight percent based on total amount of polymerized 1,3-butadiene. In some embodiments, the vinyl content of a polymer in accordance with the present teachings is from about 40 to about 70 weight percent based on total amount of polymerized 1,3-butadiene.

In some embodiments, a polymer in accordance with the present teachings has a molecular weight distribution from about 1.05 to about 1.8. In some embodiments, the molecular weight distribution is from about 1.1 to about 1.7. In some embodiments, the molecular weight distribution is from about 1.2 to about 1.6.

In some embodiments, a polymer in accordance with the present teachings has a number-average molecular weight greater than or equal to about 100,000 g/mole. In some embodiments, the number-average molecular weight is greater than or equal to about 150,000 g/mole. In some embodiments, the number-average molecular weight is greater than or equal to about 300,000 g/mole.

In some embodiments, a polymer in accordance with the present teachings has a weight-average molecular weight greater than or equal to about 180,000 g/mole. In some embodiments, the weight-average molecular weight is greater than or equal to about 200,000 g/mole. In some embodiments, the weight-average molecular weight is greater than or equal to about 360,000 g/mole.

In some embodiments, a polymer in accordance with the present teachings has only one glass transition temperature (Tg). In some embodiments, the Tg is between about −50° C. and about 20° C. In some embodiments, the Tg is between about −30° C. and about 10° C.

In some embodiments, a molar ratio of the first polar agent to active initiator is greater than about 0.3. In some embodiments, the molar ratio is greater than about 0.4. In some embodiments, the molar ratio is greater than about 0.5.

In some embodiments, a molar ratio of the second polar agent to active initiator is greater than about 0.2. In some embodiments, the molar ratio is greater than about 0.3. In some embodiments, the molar ratio is greater than about 0.5.

Initiators that are presently preferred for use in accordance with the present teachings include those suitable for anionic polymerizations. In some embodiments, an initiator for use in accordance with the present teachings is an organolithium (e.g., alkyl lithium). Representative alkyl lithium agents for use in accordance with the present teachings include but are not limited to n-butyl lithium, sec-butyl lithium, tert-butyl lithium, n-pentyl lithium, and the like, and combinations thereof. In some embodiments, the initiator comprises n-butyl lithium.

It is presently preferred that polymerizations in accordance with the present teachings take place in solvents, with hydrocarbon solvents being presently preferred. In some embodiments, the polymerization solvent comprises an alkane. In some embodiments, the polymerization solvent comprises cyclohexane. In some embodiments, the polymerization solvent comprises a mixture of cyclohexane with one or more additional alkanes.

By way of further general introduction, a polymer in accordance with the present teachings is formed by a process of a type described herein. In some embodiments, a polymer in accordance with the present teachings has at least the following characteristics: (a) a styrene content from about 40 to about 70 weight percent based on total polymer weight; (b) a vinyl content from about 30 to about 80 weight percent based on total amount of polymerized 1,3-butadiene; and (c) a molecular weight distribution from about 1.05 to about 1.8.

In some embodiments, a polymer in accordance with the present teachings is modified with a modifying agent (or modifier). Representative modifying agents include but are not limited to amines, amides, thioglycols, silicon alkoxides, silane-sulfide modifiers, and the like, and combinations thereof.

In some embodiments, a living polymer in accordance with the present teachings can be chemically modified by chain-end modification and/or coupling reactions. The appropriate chain-end modifiers and/or coupling agents can be chosen according to the target application and filler.

Representative coupling agents include but are not limited to tin tetrachloride, silicon tetrachloride, divinylbenzene, alkoxysilanes, and the like, and combinations thereof.

Representative modifiers include but are not limited to sulfenyl halides as described in European Patent Document No. EP1016674, benzophenone, isocyanate, hydroxyl mercaptans as described in European Patent Document No. EP0464478, and acrylamide compounds as described in European Patent Document No. EP0334042. Additional modifiers include but are not limited to amines, amides, imides, and nitriles modifiers as described in European Patent Document Nos. EP548799, EP510410, EP451604, and EP180141, and in U.S. Pat. No. 4,412,041. In some embodiments, silanes including but not limited to epoxy-containing silanes are used for modifying the polymer chain end for use in silica fillers as described, for example, in European Patent Document Nos. EP-A-299074, EP-A-102045, EP0447066, and EP0692493. Additional representative modifiers and/or patent references referring to such are provided in International Patent Document No. WO 2009/134665.

By way of further general introduction, a composition embodying features of the present teachings includes a polymer of a type described herein. In some embodiments, a composition in accordance with the present teachings further includes an oil. In some embodiments, a composition in accordance with the present teachings does not include an oil.

In some embodiments, a composition in accordance with the present teachings includes a polymer of a type described herein and at least one additive. In some embodiments, the polymer is combined and/or reacted with one or more fillers, a vulcanization agent, and/or optionally one or more additional additives including but not limited to accelerators, coupling agents, unmodified, uncrosslinked elastomeric polymers (i.e., conventional uncrosslinked elastomeric polymers that have not been reacted with a modifier, but that have been prepared and terminated), and the like, and combinations thereof.

In some embodiments, a composition in accordance with the present teachings includes one or more fillers, which serve as reinforcement agents. Representative examples of suitable fillers include but are not limited to carbon black, silica, carbon-silica dual-phase filler, clay, calcium carbonate, magnesium carbonate, and the like, and combinations thereof. In some embodiments, a combination of carbon black and silica, carbon-silica dual-phase-fillers or a combination of carbon-silica dual-phase-filler and carbon black and/or silica are used.

In some embodiments, carbon black is manufactured by a furnace method, and has a nitrogen adsorption specific surface area from about 50 to about 200 $m^2/g$, and a DBP oil absorption from about 80 to about 200 ml/100 grams (e.g., FEF, HAF, ISAF or SAF class carbon black). In some embodiments, a "high agglomeration type" carbon black is used. In some embodiments, carbon black or silica is added in an amount from about 2 to about 100 parts by weight for 100 parts by weight of total polymer. In some embodiments, carbon black or silica is added in an amount from about 5 to about 100 parts by weight. In some embodiments, carbon black or silica is added in an amount from about 10 to about 100 parts by weight. In some embodiments, carbon black or silica is added in an amount from about 10 to 95 parts by weight.

Finally, by way of further general introduction, an article embodying features of the present teachings includes at least one component formed from such a composition. In some embodiments, the article is a tire. In some embodiments, the article is a shoe component.

The following examples and representative procedures illustrate features in accordance with the present teachings, and are provided solely by way of illustration. They are not intended to limit the scope of the appended claims or their equivalents.

EXAMPLES

Monomer conversion was determined by measuring the solids concentration of the polymer solution at the end of the polymerization. The maximum solid content is obtained at 100 wt % conversion of the charged butadiene (mBd) and styrene (mSt) for the final polymer by TSC max=(mBd+mSt)/(mBd+mSt+mpolar agent+mBL+mcyclohexane) *100%. A sample of polymer solution ranging from about 1 g to about 10 g, depending on the expected monomer conversion, was drawn from the reactor directly into a 200-mL Erlenmeyer flask filled with ethanol (50 mL). The weight of the filled Erlenmeyer flask was determined before sampling ("A") and after sampling ("B"). The precipitated polymer was removed from the ethanol by filtration on a weighted paper filter (Micro-glass fiber paper, "90 mm, MUNKTELL, weight "C"), dried at 140° C., using a moisture analyzer HR73 (Mettler-Toledo) until a constant mass was achieved. The criterion 5 was used. Finally, a second drying period was performed using switch-off criteria 4 to obtain the final mass "D" of the dry sample on the paper filter. The polymer content in the sample was calculated as TSC=(D−C)/(B−A)*100%. The final monomer conversion was calculated as TSC/TSC max*100%.

The glass transition temperature, Tg, was measured and calculated in accordance with ISO 11357-2 (1999) applying a heat rate of 20K/min with the following specific settings:
Weight of sample: about 11 mg
Sample container: Standard aluminium pans (closed not vapor tight)
Temperature range: −150 to 100° C.
Heating rate: 20 K/min
Cooling rate: free cooling (10 to 20 K/min)
Purge gas: 20 ml He/min
Cooling agent: liquid nitrogen
Evaluation method: Inflection point
Device: DSC Q2000 of TA Instruments
2 heating runs without hold between heating and cooling, Tg was determined using the data from second heating run Molecular weight and molecular weight distribution of the polymer were each measured using Size Exclusion Chromatography (SEC) at 40° C. based on polystyrene standards. Each polymer sample (9-11 mg) was dissolved in tetrahydrofuran (10 mL) to form a solution. The solution was filtered using a 0.45-μm filter. A 100-μL sample was fed into a GPC column (Hewlett Packard system 1100 with 3 PLgel 10 μm MIXED-B columns). Refraction Index-detection was used as the detector for analyzing the molecular weight. The molecular weight was calculated as polystyrene based on the calibration with EasiCal PS1 (Easy A and B) Polystyrene standards from Polymer Laboratories. The number-average molecular weight (Mn) figures and the weight-average molecular weight (Mw) figures are given based on the polystyrene standards. The molecular weight distribution is expressed as the dispersity D=Mw/Mn.

Vinyl and total styrene content were measured using $^1$H-NMR, following ISO 21561-2005, using a NMR spectrometer IBRUKER Avance (400 MHz), and a 5-mm dual probe. CDCl$_3$/TMS was used as solvent in a weight ratio of 0.05%:99.95%. The content of block styrene consisting of more than 6 consecutive styrene units was determined according to the method reported by Y. Tanaka et al. in *Rubber Chemistry and Technology*, 1981, 54, No. 4, 685-691 using the relative intensity of ortho Ph-proton signals resonating higher than 6.7 ppm.

Procedures for Determining Livingness of Chain Ends:
As described above, the use of a combination of TMEDA and DOP results in a higher livingness of the chain ends at the end of polymerization. The ratio of living chain ends at the end of polymerization is desirable inasmuch as the higher the amount of modified chains in the polymer, the better will be the filler-rubber interaction and the lower will be the rolling resistance of the resulting vulcanized compound.

Polymers were treated with an excess of N-methylpyrrolidone NMP after achieving a monomer conversion higher than 99% to assess the livingness of the resulting polymer chains. The resulting modification rate of the polymer chain was analyzed using two different methods: method 1 is based on comparing size exclusion chromatography (SEC) ratios of ultraviolet absorption intensity (UV) to differential refractive index (RI) as described in U.S. Pat. No. 7,700,693 B2 to Karato et al.; method 2 involves adsorption on a silica gel column as described in U.S. Patent Application Publication Nos. 2009/0163668 A1 and 2009/0203843 A1. It was found that the absolute values obtained using method 1 and method 2 are different but that the trends are the same. Comparison 2 was set to 100 in each method and all data obtained were calculated according to this reference (MR in %).

Comparative Example 1

Use of Only TMEDA

Dried cyclohexane (5371.18 g) was added to an air-free, nitrogen-purged 10-L stainless steel reactor. 1,3-Butadiene (326.657 g), styrene (404.13 g), and TMEDA (2.1205 mmol) were fed into the reactor (TMEDA/active butyl lithium mol/mol=1.742).

The mixture was heated up to 50° C. with stirring. The impurities in the system were titrated by stepwise addition of butyllithium. Recognizing the endpoint, the polymerization was started by the addition of an amount nBL,pm of 1.2175 mmol of n-butyl lithium (15% solution in cyclohexane) via pump within 2 minute 16 seconds. Then the polymerization started. The temperature in the reactor increased to 65° C. within 30 minutes. The completion of the reaction was confirmed after 300 minutes by sampling and determination of the monomer conversion to be 100%. The resulting polymer was analyzed by GPC: Mn=315898, Mw=639432, D=2.02. Butadiene (3.3 g) was added followed by NMP (1.32 mmol). After 15 minutes, the reaction was completed by the addition of methanol as a terminating agent. The 4,6-bis(octylthiomethyl)-o-cresol sold under the tradename IRGANOX 1520 (Ciba) was introduced as antioxidant.

The microstructure and styrene block content were measured by $^1$H-NMR. The following results were obtained: styrene=52.5%, vinyl (1,2-polybutadiene, calculated on the butadiene fraction)=39.1%, block styrene=15%.

The measurement of the glass transition shows one glass transition temperature at −14.7° C.

The analysis of the modification rate results in 49% (method 1) and 46% (method 2) versus Comparative Example 2 (100%).

Comparative Example 2

Use of Only TMEDA

Dried cyclohexane (5429.3 g) was added to an air-free, nitrogen-purged 10-L stainless steel reactor. 1,3-Butadiene (326.4 g), styrene (402.5 g), and TMEDA (3.759 mmol) were fed into the reactor (TMEDA/active butyl lithium mol/mol=3.055).

The mixture was heated up to 50° C. with stirring. The impurities in the system were titrated by stepwise addition of butyllithium. Recognizing the endpoint, the polymerization was started by the addition of an amount nBL,pm of 1.2305 mmol of n-butyl lithium (15% solution in cyclohexane) via pump within 2 minute 16 seconds. Then the polymerization started. The temperature in the reactor increased to 65° C. within 30 minutes. The completion of the reaction was confirmed after 260 minutes by sampling and determination of the monomer conversion to be 99.7%. The resulting polymer was analyzed by GPC: Mn=319626, Mw=584252, D=1.892. Butadiene (3.3 g) was added followed by NMP (1.2286 mmol). After 15 minutes, the reaction was completed by addition of methanol as a terminating agent. IRGANOX 1520 was introduced as antioxidant.

The microstructure and styrene block content were measured by $^1$H-NMR. The following results were obtained: styrene=53%, vinyl (1,2-polybutadiene, calculated on the butadiene fraction)=42.1%, block styrene=12%.

The measurement of the glass transition shows one glass transition temperature at −9.8° C.

The results of the analysis of the modification rate were used as a reference for all other trials and set to 100 (method 1) and 100 (method 2).

Comparative Example 3

Use of Only DOP

Dried cyclohexane (5208.11 g) was added to an air-free, nitrogen-purged 10-L stainless steel reactor. 1,3-Butadiene (317.28 g), styrene (393.11 g), and DOP (1.1866 mmol) were fed into the reactor (DOP/active butyllithium=0.981).

The mixture was heated up to 50° C. with stirring. The impurities in the system were titrated by stepwise addition of butyllithium. Recognizing the endpoint, the polymerization was started by the addition of an amount nBL,pm of 1.21 mmol of n-butyl lithium (15% solution in cyclohexane) via pump within about 1 minute. Then, the polymerization started. The temperature in the reactor increased to 65° C. within 30 minutes. The completion of the reaction was confirmed after 120 minutes by sampling and determination of the monomer conversion to be 99.49%. The polymer was analyzed by GPC: Mn=587535, Mw=755240, D=1.285. Butadiene (3.34 g) was added followed by NMP (1.257 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=55.9, vinyl (1,2-polybutadiene, calculated on the butadiene fraction)=49%, block styrene=8%.

The measurement of the glass transition shows one glass transition temperature at −7.1° C. The analysis of the modification rate results in 190% (method 1) and 168% (method 2) versus Comparative Example 2 (100%).

Comparative Example 4

Use of Only DOP

Dried cyclohexane (20717.6 g) was added to an air-free and nitrogen-purged 40-L stainless steel reactor. 1,3-Butadiene (1336.66 g), styrene (1625.04 g), and DOP (5.11 mmol) were fed into the reactor (DOP/active butyllithium=1.025).

The mixture was heated up to 50° C. with stirring. The impurities in the system were titrated by stepwise addition of butyllithium. Recognizing the endpoint, the polymerization was started by the addition of an amount nBL,pm of 4.8882 mmol of n-butyl lithium (15% solution in cyclohexane) via pump within about 1 minute. Then, the polymerization started. The temperature in the reactor increased to 65° C. within 30 minutes. The reaction was stopped after 230 minutes by the addition of methanol as a terminating agent. IRGANOX 1520 was introduced as antioxidant.

A sample was withdrawn by means of a sampling tube with a stopcock and a needle for determination of the solid content. A conversion of 99.27% was measured.

The resulting polymer was analyzed by GPC: Mn=640960, Mw 837114, D=1.306. The microstructure and styrene block content were measured by $^1$H-NMR. The following results were obtained: styrene=54.9%, vinyl (1,2-polybutadiene, calculated on the butadiene fraction)=50.1%, block styrene=7%.

The measurement of the glass transition shows one glass transition temperature at −2.7° C.

Comparative Example 5

Use of Only DOP

Dried cyclohexane (5213.13 g) was added to an air-free and nitrogen-purged 10-L stainless steel reactor. 1,3-Butadiene (317.28 g), styrene (393.01 g), and DOP (1.1825 mmol) were fed into the reactor (DOP/active butyllithium=0.971).

The mixture was heated up to 50° C. with stirring. The impurities in the system were titrated by stepwise addition of butyllithium. Recognizing the endpoint, the polymerization was started by the addition of an amount nBL,pm of 1.2175 mmol of n-butyl lithium (15% solution in cyclohexane) via pump within about 1 minute. Then, the polymerization started. The temperature in the reactor increased to 65° C. within 30 minutes. The completion of the reaction was confirmed after 90 minutes by sampling and determination of the monomer conversion to be 100%. The resulting polymer was analyzed by GPC: Mn=554765, Mw=690883, D=1.245. Butadiene (3.34 g) was added followed by NMP (1.2244 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=55.2%, vinyl (1,2-polybutadiene, calculated on the butadiene fraction)=44.8%, block styrene=13%.

The measurement of the glass transition shows one glass transition temperature at −3.4° C.

The analysis of the modification rate results in 158% (method 1) and 118% (method 2) versus Comparative Example 2 (100%).

Example 1

Use of TMEDA/DOP

Dried cyclohexane (5198.72 g) was added to an air-free and nitrogen-purged 10-L stainless steel reactor. 1,3-Butadiene (316.38 g), styrene (390.99 g), TMEDA (2.1514 mmol), and DOP (1.1782 mmol) were fed into the reactor (TMEDA/active butyl lithium mol/mol=1.778; DOP/active butyllithium=0.974).

The mixture was heated up to 50° C. with stirring. The impurities in the system were titrated by stepwise addition of butyllithium. Recognizing the endpoint, the polymerization was started by the addition of an amount nBL,pm of 1.2098 mmol of n-butyl lithium (15% solution in cyclohexane) via pump within about 1 minute. Then, the polymerization started. The temperature in the reactor increased to 65° C. within 30 minutes. The completion of the reaction was confirmed after 140 minutes by sampling and determination of the monomer conversion to be 100%. The resulting polymer was analyzed by GPC: Mn=570040, Mw=725648, D=1.273. Butadiene (3.3 g) was added followed by NMP (1.260 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=55.6%, vinyl (1,2-polybutadiene, calculated on the butadiene fraction)=52.6%, block styrene=7%.

The measurement of the glass transition shows one glass transition temperature at 5.5° C.

The analysis of the modification rate results in 238% (method 1) and 201% (method 2) versus Comparative Example 2 (100%).

Example 2

Use of TMEDA/DOP

Dried cyclohexane (21303.39 g) was added to an air-free, nitrogen-purged 40-L stainless steel reactor. 1,3-Butadiene (837.86 g), styrene (1018 g), TMEDA (0.9522 mmol), and DOP (1.3811 mol) were fed into the reactor (TMEDA/active butyl lithium mol/mol 0.421; DOP/active butyllithium=0.611).

The mixture was heated up to 50° C. with stirring. The impurities in the system were titrated by stepwise addition of butyllithium. Recognizing the endpoint, the polymerization was started by the addition of an amount nBL,pm of 2.2593 mmol of n-butyl lithium (15% solution in cyclohexane) via pump within about 1 minute. Then, the polymerization started. The temperature in the reactor increased to 65° C. within 30 minutes. The reaction was finished after 150 minutes by the addition of methanol as a terminating agent. IRGANOX 1520 was introduced as antioxidant.

A sample was withdrawn by means of a sampling tube with a stopcock and a needle for determination of the solid content. A conversion of 99.14% was measured.

The resulting polymer was analyzed by GPC: Mn=716266, Mw=924048, D=1.29. The microstructure and styrene block content were measured by $^1$H-NMR. The following results were obtained: styrene=55.5%, vinyl (1,2-polybutadiene, calculated on the butadiene fraction)=38.7%, block styrene=17%.

The measurement of the glass transition shows one glass transition temperature at −12° C.

Example 3

Use of TMEDA/DOP

Dried cyclohexane (5124.2 g) was added to an air-free, nitrogen-purged 10-L stainless steel reactor.

1,3-Butadiene (315.9 g), styrene (389.5 g), TMEDA (2.0387 mmol), and DOP (1.1787 mmol) were fed into the reactor (TMEDA/active butyl lithium mol/mol=1.696; DOP/active butyllithium=0.981).

The mixture was heated up to 50° C. with stirring. The impurities in the system were titrated by stepwise addition of butyllithium. Recognizing the endpoint, the polymerization was started by the addition of an amount nBL,pm of 1.202 mmol of n-butyl lithium (15% solution in cyclohexane) via pump within about 1 minute. Then, the polymerization started. The temperature in the reactor increased to 65° C. within 30 minutes. The completion of the reaction was confirmed after 150 minutes by sampling and determination of the monomer conversion to be 99.27%. The resulting polymer was analyzed by GPC: Mn=579450, Mw=802548, D=1.385. Butadiene (3.34 g) was added followed by NMP (1.159 mmol). After 15 minutes, the reaction was completed by the addition of methanol as a terminating agent. IRGANOX 1520 was introduced as antioxidant.

The microstructure and styrene block content was measured by $^1$H-NMR. The following results were obtained: styrene=56.2, vinyl (1,2-polybutadiene, calculated on the butadiene fraction)=52.4%, block styrene=7%.

The measurement of the glass transition shows one glass transition temperature at 6.1° C.

The analysis of the modification rate results in 235% (method 1) and 188% (method 2) versus Comparative Example 2 (100%).

Example 4

Use of TMEDA/DOP

Dried cyclohexane (20951.95 g) was added to an air-free, nitrogen-purged, 40-L stainless steel reactor. 1,3-Butadiene (1282 g), styrene (1573.83 g), TMEDA (8.3477 mmol), and DOP (4.8388 mmol) were fed into the reactor (TMEDA/active butyl lithium mol/mol=1.793; DOP/active butyllithium=1.039).

The mixture was heated up to 50° C. with stirring. The impurities in the system were titrated by stepwise addition of butyllithium. Recognizing the endpoint, the polymerization was started by the addition of an amount nBL,pm of 4.6556 mmol of n-butyl lithium (15% solution in cyclohexane) via pump within about 1 minute. Then, the polymerization started. The temperature in the reactor increased to 65° C. within 30 minutes. The completion of the reaction was confirmed after 140 minutes by sampling and determination of the monomer conversion to be 99.69%. The resulting polymer was analyzed by GPC: Mn=621431, Mw=791497, D=1.274. Butadiene (3.34 g) was added followed by NMP (1.159 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=55.2%, vinyl (1,2-polybutadiene, calculated on the butadiene fraction)=53.2%, block styrene 7%.

The measurement of the glass transition shows one glass transition temperature at −5.8° C.

The analysis of the modification rate results in 229% (method 1) and 215% (method 2) versus Comparative Example 2 (100%).

Example 5

Use of DOP/TMEDA (Ratio 0.33)

Dried cyclohexane (5200.58 g) was added to an air-free, nitrogen-purged 10-L stainless steel reactor. 1,3-Butadiene (316.18 g), styrene (390.89 g), TMEDA (3.574 mmol), and DOP (1.1773 mmol) were fed into the reactor (TMEDA/active butyl lithium mol/mol=2.967; DOP/active butyllithium=0.977).

The mixture was heated up to 50° C. with stirring. The impurities in the system were titrated by stepwise addition of butyllithium. Recognizing the endpoint, the polymerization was started by the addition of an amount nBL,pm of 1.2046 mmol of n-butyl lithium (15% solution in cyclohexane) via pump within about 1 minute. Then, the polymerization started. The temperature in the reactor increased to 65° C. within 30 minutes. The reaction was finished after 300 minutes by the addition of methanol as a terminating agent. IRGANOX 1520 was introduced as antioxidant.

A sample was withdrawn by means of a sampling tube with a stopcock and a needle for determination of the solid content. A conversion of 98.06% was measured.

The resulting polymer was analyzed by GPC: Mn=522906, Mw=706231, D=1.35. The microstructure and styrene block content were measured by $^1$H-NMR. The following results were obtained: styrene=55.8, vinyl (1,2-polybutadiene, calculated on the butadiene fraction)=51.4%, block styrene=6%.

The measurement of the glass transition shows one glass transition temperature at −9.9° C.

Example 6

Use of DOP/TMEDA (Ratio 3.33)

Dried cyclohexane (5194.45 g) was added to an air-free, nitrogen-purged 10-L stainless steel reactor. 1,3-Butadiene (316.08 g), styrene (392.11 g), TMEDA (0.3647 mmol), and DOP (1.1776 mmol) were fed into the reactor (TMEDA/active butyl lithium mol/mol=0.302; DOP/active butyllithium=0.975).

The mixture was heated up to 50° C. with stirring. The impurities in the system were titrated by stepwise addition of butyllithium. Recognizing the endpoint, the polymerization was started by the addition of an amount nBL,pm of 1.2075 mmol of n-butyl lithium (15% solution in cyclohexane) via pump within about 1 minute. Then, the polymerization started. The temperature in the reactor increased to 65° C. within 30 minutes. The completion of the reaction was confirmed after 120 minutes by sampling and determination of the monomer conversion to be 99.37%. Butadiene (4.04 g) was added followed by NMP (1.21 mmol). After 15 minutes, the reaction was completed by the addition of methanol as a terminating agent. IRGANOX 1520 was introduced as antioxidant.

The resulting polymer was analyzed by GPC: Mn=594011, Mw=731376, D=1.231. The microstructure and styrene block content were measured by $^1$H-NMR. The following results were obtained: styrene=55.9, vinyl (1,2-polybutadiene, calculated on the butadiene fraction)=49.9%, block styrene=7%.

The measurement of the glass transition shows one glass transition temperature at −0.8° C.

The analysis of the modification rate results in 207% (method 1) versus Comparative Example 2 (100%).

Example 7

Use of DOP/TMEDA (Ratio 1.67)

Dried cyclohexane (5187.95 g) was added to an air-free, nitrogen-purged 10-L stainless steel reactor. 1,3-Butadiene (316.08 g), styrene (391.71 g), TMEDA (0.7125 mmol), and DOP (1.1776 mmol) were fed into the reactor (TMEDA/active butyl lithium mol/mol=0.601; DOP/active butyllithium 0.993).

The mixture was heated up to 50° C. with stirring. The impurities in the system were titrated by stepwise addition of butyllithium. Recognizing the endpoint, the polymerization was started by the addition of an amount nBL,pm of 1.1861 mmol of n-butyl lithium (15% solution in cyclohexane) via pump within about 1 minute. Then, the polymerization started. The temperature in the reactor increased to 65° C. within 30 minutes. The completion of the reaction was confirmed after 120 minutes by sampling and determination of the monomer conversion to be 100%.

The resulting polymer was analyzed by GPC: Mn=639375, Mw=794175, D=1.242, Butadiene (3.24 g) was added followed by NMP (1.22 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=54.5, vinyl (1,2-polybutadiene, calculated on the butadiene fraction)=52.8%, block styrene=7%.

The measurement of the glass transition shows one glass transition temperature at 2.8° C. The analysis of the modification rate results in 189% (method 1) versus Comparative Example 2 (100%).

Example 8

Use of DOP/TMEDA (Ratio 0.18)

Dried cyclohexane (5220.87 g) was added to an air-free, nitrogen-purged 10-L stainless steel reactor. 1,3-Butadiene (323.08 g), styrene (400.33 g), TMEDA (2.0638 mmol), and DOP (0.3614 mmol) were fed into the reactor (TMEDA/active butyl lithium mol/mol=1.702; DOP/active butyllithium 0.298).

The mixture was heated up to 50° C. with stirring. The impurities in the system were titrated by stepwise addition of butyllithium. Recognizing the endpoint, the polymerization was started by the addition of an amount nBL,pm of 1.2124 mmol of n-butyl lithium (15% solution in cyclohexane) via pump within about 1 minute. Then, the polymerization started. The temperature in the reactor increased to 65° C. within 30 minutes. The completion of the reaction was confirmed after 180 minutes by sampling and determination of the monomer conversion to be 99.9%. The polymer was analyzed by GPC: Mn=526290, Mw=779925, D T 1.482. Butadiene (3.34 g) was added followed by NMP (1.837 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=55.1, vinyl (1,2-polybutadiene, calculated on the butadiene fraction)=45.4%, block styrene=9%.

The measurement of the glass transition shows one glass transition temperature at −1.2° C. The analysis of the modification rate results in 191% (method 1) versus Comparative Example 2 (100%).

Example 9

Use of DOP/TMEDA (Ratio 0.35)

Dried cyclohexane (5257.45 g) was added to an air-free, nitrogen-purged 10-L stainless steel reactor.

1,3-Butadiene (319.98 g of), styrene (396.32 g), TMEDA (2.042 mmol), and DOP (0.7172 mmol) were fed into the reactor (TMEDA/active butyl lithium mol/mol=1.681, DOP/active butyllithium=0.590).

The mixture was heated up to 50° C. with stirring. The impurities in the system were titrated by stepwise addition of butyllithium. Recognizing the endpoint, the polymerization was started by the addition of an amount nBL,pm of 1.2147 mmol of n-butyl lithium (15% solution in cyclohexane) via pump within about 1 minute. Then, the polymerization started. The temperature in the reactor increased to 65° C. within 30 minutes. The completion of the reaction was confirmed after 150 minutes by sampling and determination of the monomer conversion to be 98.97%.

The resulting polymer was analyzed by GPC: Mn=580671, Mw=811981, D=1.4. Butadiene (3.24 g) was added followed by NMP (1.2526 mmol). After 15 minutes, the reaction was completed by the addition of methanol as a terminating agent. IRGANOX 1520 was introduced as antioxidant.

The microstructure and styrene block content were measured by $^1$H-NMR. The following results were obtained: styrene=56.2, vinyl (1,2-polybutadiene, calculated on the butadiene fraction)=52.4%, block styrene=7%.

The measurement of the glass transition shows one glass transition temperature at 3.2° C.

The analysis of the modification rate results in 212% (method 1) versus Comparative Example 2 (100%).

The entire contents of every one of the patent and non-patent documents cited above are hereby incorporated by reference, except that in the event of any inconsistent disclosure or definition from the present specification, the disclosure or definition herein shall be deemed to prevail.

The foregoing detailed description and accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A process for polymerization of a polymer comprising monomeric units derived from a styrene monomer and a 1,3-butadiene monomer, the process comprising:
  polymerizing the monomers in the presence of an initiator, a first polar agent, and a second polar agent;
  wherein the first polar agent comprises a structure (I):

$R^{1'}R^{2'}N-Q-NR^{3'}R^{4'}$ (I);

wherein the second polar agent comprises a structure (II):

(II)

wherein $R^{1'}$, $R^{2'}$, $R^{3'}$, and $R^{4'}$ are each independently selected from the group consisting of an alkyl group and hydrogen;
  wherein Q comprises an alkylene group;
  wherein $R^1$ and $R^2$ are each independently an alkyl group;
  wherein $R^3$, $R^4$, $R^5$, $R^6$, $R^7$ and $R^8$ are each independently selected from the group consisting of an alkyl group and hydrogen; and wherein the polymer comprises a vinyl content from greater than 30 to about 80 weight percent, based on toatle amount of polymerized 1,3-butadiene.

2. The process as in claim 1 wherein $R^{1'}$, $R^{2'}$, $R^{3'}$, and $R^{4'}$ are each independently selected from the group consisting of hydrogen and a $C_1$-$C_4$ alkyl group.

3. The process of claim 1 wherein the alkylene group comprises a structure —$(CH_2)_n$—, wherein n is an integer equal to or greater than 2.

4. The process of claim 1 wherein $R^1$ and $R^2$ are each independently a $C_1$-$C_4$ alkyl group.

5. The process of claim 1 wherein $R^3$, $R^4$, $R^5$, $R^6$, $R^7$ and $R^8$ are each independently selected from the group consisting of hydrogen and a $C_i$-$C_4$ alkyl group.

6. The process of claim 1 wherein a molar ratio of the second polar agent to the first polar agent is between about 0.01 and about 10.

7. The process of claim 1 wherein the first polar agent comprises tetramethylethylenediamine.

8. The process of claim 1 wherein the second polar agent comprises ditetrahydrofurylpropane.

9. The process of claim 1 wherein the polymer comprises a styrene content from about 20 to about 80 weight percent.

10. The process of claim 1 wherein the polymer has a molecular weight distribution from about 1.05 to about 1.8.

11. The process of claim 1 wherein the polymer has a number-average molecular weight greater than or equal to about 100,000 g/mole.

12. The process of claim 1 wherein the polymer has a weight-average molecular weight greater than or equal to about 180,000 g/mole.

13. The process of claim 1 wherein the polymer has only one glass transition temperature (Tg), which is about −50° C. to about 20° C.

14. The process of claim 1 wherein a molar ratio of the first polar agent to active initiator is greater than about 0.3.

15. The process of claim 1 wherein a molar ratio of the second polar agent to active initiator is greater than about 0.3.

16. The process of claim 1 wherein the polymerization is run at a temperature of between about 10° C. and about 80° C.

17. The process of claim 1 wherein the initiator comprises n-butyl lithium.

18. The process of claim 1 wherein the polymerizing takes place in a hydrocarbon solvent.

* * * * *